United States Patent
Carr et al.

[11] 3,878,217
[45] Apr. 15, 1975

[54] ALPHA-ARYL-4-SUBSTITUTED PIPERIDINOALKANOL DERIVATIVES

[75] Inventors: Albert A. Carr; Richard Kinsolving, both of Cincinnati, Ohio

[73] Assignee: Richardson-Merrell Inc., New York, N.Y.

[22] Filed: July 12, 1973

[21] Appl. No.: 378,561

Related U.S. Application Data
[63] Continuation-in-part of Ser. No. 221,821, Jan. 28, 1972, abandoned.

[52] U.S. Cl............... 260/293.64; 260/247.5 G; 260/268 PH; 260/293.68; 260/293.71; 260/293.79; 260/293.83; 260/293.84; 424/248; 424/250; 424/267
[51] Int. Cl............................................ C07d 29/28
[58] Field of Search ............ 260/247.5 G, 268 PH, 260/293.64, 293.68, 293.71, 293.79, 293.83, 293.84

[56] References Cited
UNITED STATES PATENTS
3,687,956   8/1972   Zivkovic....................... 260/293.83

Primary Examiner—Henry N. Jiles
Assistant Examiner—S. D. Winters
Attorney, Agent, or Firm—L. Ruth Hattan; Eugene O. Retter; George W. Rauchfuss, Jr.

[57] ABSTRACT
Novel compounds useful as antihistamine agents, antiallergy agents, and bronchodilators are represented by the following formula

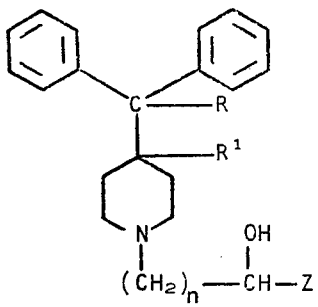

wherein R represents hydrogen or hydroxy; $R^1$ represents hydrogen; or R and $R^1$ taken together form a second bond between the carbon atoms bearing R and $R^1$; n is a positive whole integer of from 1 to 3; Z represents thienyl, phenyl, or substituted phenyl wherein the substituents on the substituted phenyl may be attached at the ortho, meta, or para positions of the phenyl ring and are selected from halogen, a straight or branched lower alkyl chain of from 1 to 4 carbon atoms, a lower alkoxy group of from 1 to 4 carbon atoms, di(lower alkylamino, or a saturated monocyclic heterocyclic group such as pyrrolidino, piperidino, morpholino, or N-(lower)alkylpiperazino. Pharmaceutically acceptable acid addition salts and individual optical isomers of compounds of the above formula are also included within this invention.

20 Claims, No Drawings

ALPHA-ARYL-4-SUBSTITUTED PIPERIDINOALKANOL DERIVATIVES

This is a continuation-in-part of copending application Ser. No. 221,821, filed Jan. 28, 1972 and now abandoned.

FIELD OF INVENTION

This invention relates to novel substituted piperidine derivatives. More particularly this invention relates to α-aryl-4-substituted piperidinoalkanol derivatives which are useful as antihistamines, antiallergy agents and bronchodilators and to methods of making and using the same.

SUMMARY OF INVENTION

The novel substituted piperidine derivatives of this invention useful as antihistamines, antiallergy agents, and bronchodilators are represented by the formula

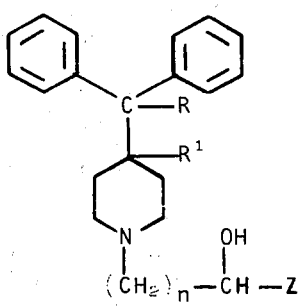

Formula I wherein R represents hydrogen or hydroxy; $R^1$ represents hydrogen; or R and $R^1$ taken together form a second bond between the carbon atoms bearing R and $R^1$; n is a positive whole integer of from 1 to 3; Z represents thienyl, phenyl or substituted phenyl wherein the substituents on the substituted phenyl are selected from a halogen atom, such as chlorine, fluorine, bromine, or iodine, a straight or branched lower alkyl chain of from 1 to 4 carbon atoms, a lower alkoxy group of from 1 to 4 carbon atoms, a di(lower)alkylamino group, or a saturated monocyclic heterocyclic group such as pyrrolidino, piperidino, morpholino, or N-(lower)alkylpiperazino and may be attached at the ortho, meta, or para positions of the phenyl ring. Included in the scope of this invention are the pharmaceutically acceptable acid addition salts and individual optical isomers of the compounds of Formuls I.

DETAILED DESCRIPTION OF INVENTION

It can be seen from the above Formula I that compounds of this invention may be 4-diphenylmethylpiperidine derivatives as represented by the following Formula II, 4-(α-hydroxy-α-phenylbenzyl)piperidine derivatives as represented by the following Formula III, or 4-diphenylmethylenepiperidine derivatives as represented by the following Formula IV.

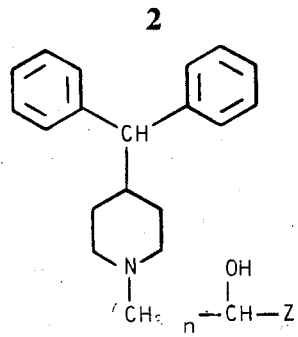

Formula II

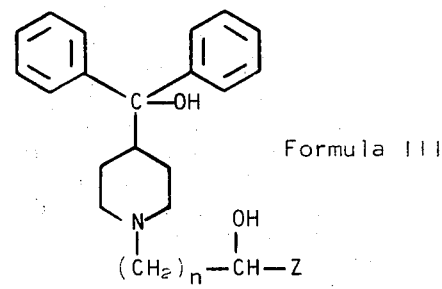

Formula III

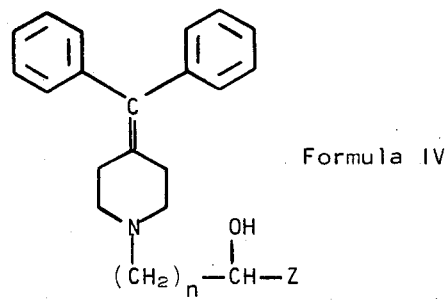

Formula IV

In the above Formulas II, III and IV, $n$ and Z have the same meanings as defined hereinbefore.

The term lower alkyl as used in describing the compounds of this invention is taken to mean a straight or branched alkyl chain of from 1 to 4 carbon atoms. As examples of lower alkyl groups that may be present in the compounds for Formulas I to IV as a straight or branched lower alkyl substituent, or in the di(lower)alkylamine substituent, or in the N-(lower)alkylpiperazine substituent on Z when Z represents a substituted phenyl there may be mentioned, methyl, ethyl, n-propyl, n-butyl, isopropyl, isobutyl and tert-butyl.

The preferred compounds of this invention are those of general Formulas III and IV wherein $n$ and Z have the meanings defined hereinbefore, and may be represented by the following Formula V. These compounds have superior antihistamine and antiallergy properties and are bronchodilators. In addition these compounds lack central nervous system stimulant and depressant effects, thus making them particularly useful as antihistamine and antiallergy agents and as bronchodilators.

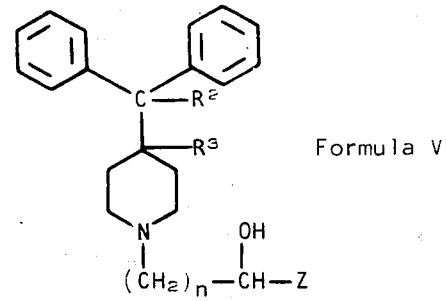

Formula V

In the above Formula V, $R^2$ represents hydroxy, and $R^3$ represents hydrogen, or $R^2$ and $R^3$ taken together form a second bond between the carbon atoms bearing $R^2$ and $R^3$; $n$ is an integer of from 1 to 3, and Z represents thienyl, phenyl, or substituted phenyl wherein the substituents on the substituted phenyl may be attached at the ortho, meta or para positions of the phenyl ring and are selected from a halogen atom, such as, chlorine, fluorine, or bromine, a straight or branched lower alkyl chain of from 1 to 4 carbon atoms, a lower alkoxy group of from 1 to 4 carbon atoms, a di(lower)alkylamino group, or a saturated monocyclic heterocyclic group such as pyrrolidino, piperidino, morpholino, or N-(lower)alkylpiperazino.

The more preferred compounds of this invention are those of general Formula V wherein $n$ is equal to 3.

This invention also includes the pharmaceutically acceptable acid addition salts of the compounds of the hereinbefore set forth formulas, optical iosmers and salts thereof. Pharmaceutically acceptable acid addition salts of the compounds of this invention are those of any suitable inorganic or organic acid. Suitable inorganic acids are, for example, hydrochloric, hydrobromic, sulphuric, phosphoric acids and the like. Suitable organic acids include carboxylic acids such as, for example, acetic, propionic, glycolic, lactic, pyruvic, malonic, succinic, fumaric, malic, tartaric, citric, ascorbic, maleic, hydroxymaleic, and dihydroxymaleic, benzoic, phenylacetic, 4-aminobenzoic, 4-hydroxybenzoic, anthranilic, cinnamic, salicylic, 4-aminosalicylic, 2-phenoxybenzoic, 2-acetoxybenzoic, mandelic acid and the like, sulfonic acids such as, for example, methanesulfonic ethanesulfonic, $\beta$-hydroxyethanesulfonic acid, and the like.

As examples of compounds illustrative of this invention there may be mentioned, for example, $\alpha$-(p-fluorophenyl)-4-($\alpha$-hydroxy-$\alpha$-phenylbenzyl)-1-piperidinebutanol, 4-(diphenylmethyl)-$\alpha$-(p-fluorophenyl)-1-piperidinebutanol, 4-(diphenylmethyl)-$\alpha$-(p-ethoxyphenyl)-1-piperidinepropanol, 4-($\alpha$-hydroxy-$\alpha$-phenylbenzyl)-$\alpha$-(p-morpholinophenyl)-1-piperidinebutanol, $\alpha$-(p-tert-butylphenyl)-4-($\alpha$-hydroxy-$\alpha$-phenylbenzyl)-1-piperidinebutanol, 4-(diphenylmethylene)-$\alpha$-(2-thienyl)-1-piperidinebutanol, 4-(diphenylmethylene)-$\alpha$-(p-fluorophenyl)-1-piperidinebutanol, 4-(diphenylmethylene)-$\alpha$-(p-methoxyphenyl)-1-piperidinebutanol, 4-(diphenylmethylene)-$\alpha$-(p-dimethylaminophenyl)-1-piperidinepropanol, 4-($\alpha$-hydroxy-$\alpha$-phenylbenzyl)-$\alpha$-phenyl-1-piperidineethanol, 4-(diphenylmethyl)-$\alpha$-(p-isopropylphenyl)-1-piperidinebutanol.

The novel compounds of this invention are useful as antihistamines, antiallergy agents and bronchodilators and may be administered alone or with suitable pharmaceutical carriers, and can be in solid or liquid form such as, for example, tablets, capsules, powders, solutions, suspensions, or emulsions.

The compounds of this invention can be administered orally, parenterally, for example, subcutaneously, intravenously, intramuscularly, intraperitoneally, by intranasal instillation or by application to mucous membranes such as that of the nose, throat, and bronchial tubes, for example in an aerosol spray containing small praticales of a compound of this invention in a spray or dry powder form.

The quantity of novel compound administered will vary. Depending on the patient and the mode of administration, the quantity of novel compound administered may vary over a wide range to provide in a unit dosage of from about 0.01 to 20 milligrams per kilogram of body weight of the patient per dose to achieve the desired effect. For example the desired antihistamine, antiallergy and bronchodilator effects can be obtained by consumption of a unit dosage form such as, for example, a tablet containing 1 to 50 milligrams of a novel compound of this invention taken one to four times daily.

The solid unit dosage forms can be of the conventional type. Thus, the solid form can be a capsule which can be the ordinary gelatin type containing a novel compound of this invention and a carrier, for example, lubricant and inert fillers such as lactose, sucrose, corn starch, and the like. In another embodiment, the novel compounds are tabletted with conventional tablet bases such as lactose, sucrose, corn starch, and the like in combination with binders such as acacia, corn starch or gelatin, disintegrating agents such as corn starch, potato starch, or alginic acid, and a lubricant such as stearic acid, or magnesium stearate.

The novel compounds may also be administered as injectable dosages by solution or suspension of the compounds in a physiologically acceptable diluent with a pharmaceutical carrier which can be a sterile liquid such as water and oils, with or without the addition of a surfactant and other pharmaceutically acceptable adjuvants. Illustrative of oils there can be mentioned those of petroleum, animal, vegetable or synthetic origin, for example, peanut oil, soybean oil, mineral oil, and the like. In general, water, saline, aqueous dextrose, and related sugar solutions, and glycols such as propylene glycol or polyethylene glycol are preferred liquid carriers, particularly for injectable solutions.

For use as aerosols the novel compounds in solution or suspension may be packaged in a pressurized aerosol container together with a gaseous or liquefied propellant, for example, dichlorodifluoromethane, dichlorodifluoromethane with dichlorodilfuoroethane, carbon dioxide, nitrogen, propane, etc. with the usual adjuvants such as cosolvents, and wetting agents, as may be necessary or desirable. The compounds may be administered in a nonpressurized form such as in a nebulizer or atomizer.

To illustrate the utility of the compounds of this invention the following tabulation indicates the amount of certain representative compounds of this invention required to reduce by 50 percent wheals induced by intradermal injections of 1$\gamma$ of histamine into guinea pigs. Each compound was orally administered 1 hour prior to the histamine injection.

| Ex. no. | Compound | $ED_{50}$ mg/kg |
| --- | --- | --- |
| 1 | $\alpha$-(p-tert-Butylphenyl)-4-($\alpha$-hydroxy-$\alpha$-phenylbenzyl-1-piperidinebutanol | 1.6 |
| 2 | 4-(Diphenylmethylene)-$\alpha$-(p-fluorophenyl)-1-piperidinebutanol | 3.8 |
| 3 | 4-($\alpha$-Hydroxy-$\alpha$-phenylbenzyl)-$\alpha$-(p-fluorophenyl)-1-piperidinebutanol | 7.5 |
| 4 | 4-($\alpha$-Hydroxy-$\alpha$-phenylbenzyl)-$\alpha$-(2-thienyl)-1-piperidinebutanol | 9.7 |

The minimal amounts of the compounds of Examples 1, 3 and 4 required to prevent aerosol antigen induced bronchial spasms and death in the guinea pig is respectively 1.0, 2.0 and 4.0 milligrams per kilogram of body weight orally.

The example numbers of the above compounds correspond to the example numbers of compounds used to specifically illustrate the invention.

The compounds of this invention may be prepared by reducing the corresponding aryl 4-substituted piperidinoalkyl ketone as illustrated below:

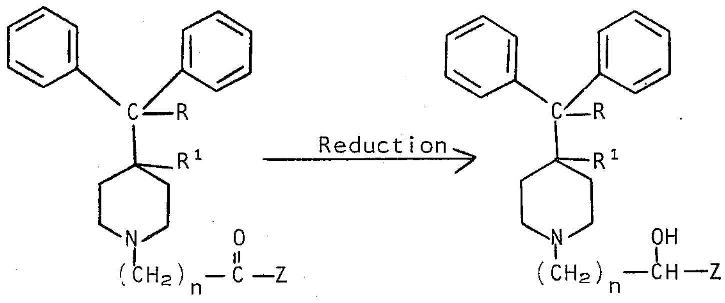

1 Formula I

In the above reaction R, $R^1$, *n* and Z have the meanings defined in Formula I.

Preferred reducing agents such as sodium borohydride may be employed in the above reaction using a lower alcohol solvent such as methanol, isopropyl alcohol, tert-butanol and the like. The reaction is carried out at temperatures ranging from about 0°C to the reflux temperature of the solvent, and the reaction time varies from about 0.5 to about 8 hours. Other hydrides as reducing agents such as lithium aluminum hydride and diborane may also be used in an appropriate solvent such as diethyl ether.

This reaction may also be achieved by catalytic reduction using Raney nickel, palladium, platinum or rhodium catalysts in lower alcohol solvents, acetic acid, or their aqueous mixtures, or by aluminum isopropoxide in isopropanol.

The aryl substituted piperidinoalkyl ketones as represented by compound 1 may be prepared by an alkylation reaction of an appropriately substituted piperidine derivative with an ω-haloalkyl aryl ketone derivative in an alcoholic or hydrocarbon solvent in the presence of a base as disclosed in copending application Ser. No. 221,823, now U.S. Pat. No. 3,806,526, incorporated herein by reference thereto.

The compounds of this invention may also be prepared by the alkylation of 4-diphenylmethylenepiperidine, 4-diphenylmethylpiperidine, or α,α-diphenyl-4-piperidinemethanol with an α-aryl-ω-haloalkanol derivative in an alcoholic or a hydrocarbon solvent in the presence of a base for from about 24 to 72 hours at a temperature varying from about 70°C to the reflux temperature of the solvent. The following examples are illustrative of the invention. The optical isomers of the compounds of this invention may be separated by using a (+) or (−) binaphthylphosphoric acid derivative or a salt of said derivative and an optically active base by the method described by R. Viterbo et al., in Tetrahedron Letters No. 48, pp. 4617–4620 (1971) and in copending application Ser. No. 233,793. Specific Examples 26 and 27 disclosed herein illustrate this method.

The following specific examples are illustrative of the compounds of this invention.

EXAMPLE 1

α-(p-tert-Butylphenyl)-4-(α-hydroxy-α-phenylbenzyl)-1-piperidinebutanol

To 60 g (0.12 mole) of 4'-tert-butyl-4-[4-(α-hydroxy-α-phenylbenzyl)piperidino]butyrophenone hydrochloride dissolved in 1200 ml of methanol was added methanolic potassium hydroxide until the solution was basic. The solution was cooled in an ice bath with stirring and 5 g (0.13 mole) of sodium borohydride was added portionwise. The mixture was stirred an additional half hour, allowed to warm to room temperature then heated on a steam bath for half an hour. The solvent was removed at reduced pressure, and the remaining residue was washed with water and recrystallized from acetone to give the desired product, M.P. 146.5°148.5°C.

The title compound may also be prepared by reducing at 2 atmospheres of hydrogen pressure in the presence of rhodium on charcoal catalyst for about 3 hours the corresponding butyrophenone derivative dissolved in methanol. Following the reduction reaction the catalyst is removed by filtration, and the remaining material is concentrated to a solid which is purified by recrystallization to give the desired product.

EXAMPLE 2

4-(Diphenylmethylene)-α-(p-fluorophenyl)-1-piperidinebutanol hydrochloride

To 12 g (0.029 mole) of 4'-fluoro-4-(4-diphenylmethylenepiperidino)butyrophenone dissolved in 1000 ml of isopropyl alcohol was added 1 g (0.027 mole) of sodium borohydride. The mixture was allowed to stand for 45 minutes after which it was heated to boiling. The solvent was removed, and the remaining residue was triturated with water then petroleum-ether and filtered. The residue was recrystallized from ether-petroleum-ether to give 4-(diphenylmethylene)-α-(p-fluorophenyl)-1-piperidinebutanol which was subsequently converted to the hydrochloride salt, M.P. 193°–194°C.

EXAMPLE 3

4-(α-Hydroxy-α-phenylbenzyl)-α-(p-fluorophenyl)-1-piperidinebutanol

To 43.15 g (0.1 mole) of 4'-fluoro-4-[4-(α-hydroxy-α-phenylbenzyl)piperidino]butyrophenone in 3 liters of methanol was added portionwise at room temperature 3.78 g (0.1 mole) of sodium borohydride. The mixture was allowed to stand at room temperature for 1 hour after which the solvent was removed at reduced pressure while the mixture was being heated on a steam bath. The remaining residue was dissolved in ether-water and separated. The ether layer was washed with water, dried over anhydrous magnesium sulfate, and filtered. The ether was evaporated, and petroleum-ether was added. A precipitate formed which was recrystallized from ether to give the desired product, M.P. 114.5°–116.5°C.

EXAMPLE 4

4-(α-Hydroxy-α-phenylbenzyl)-α-(2-thienyl)-1-piperidinebutanol

To 15.1 g (0.03 mole) of 4-[4-(α-hydroxy-α-phenylbenzyl)piperidino]-1-(2-thienyl)butan-1-one hydrochloride, dissolved in 600 ml of methanol was added alcoholic potassium hydroxide until the solution was basic. To this solution 4 g (0.11 mole) of sodium borohydride was added portionwise, and the mixture was allowed to stand overnight. The solvent was removed on a steam bath, and 150 ml of water was added to the remaining residue which then solidified. The solid was filtered and washed with water and recrystallized from acetone and hexane to give the desired product, M.P. 134°–136°C.

EXAMPLE 5

α-(p-Bromophenyl)-4-(α-hydroxy-α-phenylbenzyl)-1-piperidinebutanol

To a solution of 23 g (0.044 mole) of 4'-bromo-4-[4-(α-hydroxy-α-phenylbenzyl)piperidino]butyrophenone hydrochloride in 900 ml of methanol, which was previously treated with excess alcoholic potassium hydroxide cooled to 0°C, was added 4 g (0.11 mole) of sodium borohydride. The mixture was stirred for 15 minutes maintaining the reaction temperature at 0°C then slowly warmed to room temperature. The solvent was removed and water was added. An oil formed which was extracted into toluene, dried over magnesium sulfate and filtered. The filtrate was concentrated to a 100 ml volume then 250 ml of 75°–90° petroleum-ether was added, and the material was cooled. The resulting precipitate was recrystallized from ether, 75°–90° petroleum-ether and acetone to give the desired product, M.P. 134°–137°C.

EXAMPLE 6

α-(p-Bromophenyl)-4-(diphenylmethylene)-1-piperidinebutanol hydrochloride

To 7.3 g (0.019 mole) of 4'-bromo-4-(4-diphenylmethylenepiperidino)butyrophenone hydrochloride dissolved in 1500 ml of methanol was added methanolic potassium hydroxide until the solution was basic after which 2 g (0.053 mole) of sodium borohydride was added. The mixture was allowed to stand for 3 hours, then the methanol was removed by heating at reduced pressure. Water was added to the residue and the resulting solid was collected by filtration and dissolved in eith. The ether solution was dried over anhydrous magnesium sulfate, and filtered. The filtrate was treated with ethereal HCl, and the resulting precipitate was recrystallized from methanol-ethyl acetate to give the desired product, M.P. 215°–217°C.

EXAMPLE 7

4-(Diphenylmethyl)-α-phenyl-1-piperidinebutanol

A mixture of 39.76 g (0.1 mole) of 4-(4-diphenylmethylpiperidino)butyrophenone, 3 liters of isopropyl alcohol, 500 ml of methanol and 8 g (0.21 mole) of sodium borohydride was allowed to stand at room temperature for 63 hours. The solvent was removed at reduced pressure after which 1 liter of water was added. The resulting solid was filtered off and recrystallized from petroleumether to give the desired product, M.P. 122.5°–124°C.

EXAMPLE 8

4-(Diphenylmethyl)-α-(p-fluorophenyl)-1-piperidinebutanol

To a mixture of 45.2 g (0.1 mole) of 4'-fluoro-4-(4-diphenylmethylpiperidino)butyrophenone hydrochloride, 2500 ml of warm isopropyl alcohol and 5.6 g of potassium hydroxide was added 4 g (0.105 mole) of sodium borohydride. The mixture was allowed to stand one/half hour after which another 4 g (0.105 mole) of sodium borohydride was added. The mixture was allowed to stand for 1 hour, then it was heated to boiling. The solvent was removed under vacuum, and water was added to the solid residue. The solid was collected on a filter, washed with water and recrystallized from 75°–90° petroleum ether to give the desired product, M.P. 129°–131°C.

Similarly, by the procedure of Example 1, only substituting for 4'-tert-butyl-4-[4-(α-hydroxy-α-phenylbenzyl)piperidino]butyrophenone hydrochloride, an appropriate molar equivalent amount of one of the starting materials listed in the following Table I, the respective products listed in Table I are obtained.

Table I

| Example No. | Starting Material | Product |
| --- | --- | --- |
| 9 | 4-[4-(α-Hydroxy-α-phenylbenzyl)piperidino]butyrophenone hydrochloride. M.P. 193.5–195°C. | 4-(α-Hydroxy-α-phenylbenzyl)-α-phenyl-1-piperidinebutanol |
| 10 | 4-[4-(α-Hydroxy-α-phenylbenzyl)piperidino]-4'-methylbutyrophenone hydrochloride. M.P. 236–237°C. | 4-(α-Hydroxy-α-phenylbenzyl)-α-(p-methylphenyl)-1-piperidinebutanol |
| 11 | 4'-Fluoro-4-[4-(α-hydroxy-α-phenylbenzyl)piperidino]butyrophenone hydrochloride, M.P. 171–174°C. | α-(p-Fluorophenyl)-4-(α-hydroxy-α-phenylbenzyl)-1-piperidinebutanol |

Similarly, by the procedure of Example 2, only substituting for 4'-fluoro-4-(4-diphenylmethylenepiperidino)butyrophenone, an appropriate molar equivalent amount of one of the starting materials listed in Table II, the respective products listed in Table II are obtained.

Table II

| Example No. | Starting Material | Product |
| --- | --- | --- |
| 12 | 4'-Fluoro-3-[4-(α-hydroxy-α-phenylbenzyl)piperidino-propiophenone, M.P. 250°C | α-(p-Fluorophenyl)-4-(α-hydroxy-α-phenylbenzyl)-1-piperidinepropanol |
| 13 | 4-[4-(α-Hydroxy-α-phenylbenzyl)piperidino]-4'-piperidinobutyrophenone, M.P. 137.5–139°C. | 4-(α-Hydroxy-α-phenylbenzyl)-α-(p-piperidinophenyl)-1-piperidinebutanol, M.P. 74–78°C. |

EXAMPLE 14

An illustrative composition for hard gelatin capsules is as follows:

| | |
|---|---|
| (a) α-(p-tert-butylphenyl)-4-(α-hydroxy-α-phenylbenzyl)-1-piperidinebutanol | 10 mg |
| (b) talc | 5 mg |
| (c) lactose | 100 mg |

The formulation is prepared by passing the dry powders of (a) and (b) through a fine mesh screen and mixing them well. The powder is then filled into hard gelatin capsules at a net fill of 115 mg per capsule.

EXAMPLE 15

An illustrative composition for tablets is as follows:

| | |
|---|---|
| (a) α-(p-tert-butylphenyl)-4-(α-hydroxy-α-phenylbenzyl)-1-piperidinebutanol | 5 mg |
| (b) starch | 43 mg |
| (c) lactose | 60 mg |
| (d) magnesium stearate | 2 mg |

The granulation obtained upon mixing the lactose with the compound (a) and part of the starch and granulated with starch paste is dried, screened, and mixed with the magnesium stearate. The mixture is compressed into tablets weighing 110 mg each.

EXAMPLE 16

An illustrative composition for an aerosol solution is the following:

| | Weight per cent |
|---|---|
| (a) 4-(α-hydroxy-α-phenylbenzyl)-α-(p-fluorophenyl)-1-piperidinebutanol | 5.0 |
| (b) ethanol | 35.0 |
| (c) dichlorodifluoromethane | 60.0 |

The materials (a), (b) and (c) are packaged in 15 ml stainless steel containers equipped with a metering valve designed to meter 0.2 grams per does, an equivalent of 10 mg of novel compound (a).

EXAMPLE 17

An illustrative composition for an aerosol suspension is the following:

| | Weight per cent |
|---|---|
| (a) 4-(α-hydroxy-α-phenylbenzyl)-α-(2-thienyl)-1-piperidinebutanol (Particle size <10μ) | 20.0 |
| (b) sorbitan trioleate | 0.5 |
| (c) dichlorodifluoromethane | 39.75 |
| (d) dichlorodifluoroethane | 39.75 |

The materials (a)–(d) are packaged in 15 ml stainless steel containers equipped with a metering valve designed to meter 50 mg per dose, an equivalent of 10 mg of novel compound(a).

EXAMPLE 18

An illustrative composition for an injectable suspension is the following 1 ml ampul for an intramuscular injection.

| | Weight per cent |
|---|---|
| (a) α-(p-tert-butylphenyl)-4-(α-hydroxy-α-phenylbenzyl)-1-piperidinebutanol (particle size <10μ) | 1.0 |
| (b) polyvinylpyrrolidone (M.W. 25000) | 0.5 |
| (c) lecithin | 0.25 |
| (d) water for injection to make | 100.0 |

The materials (a)–(d) are mixed, homogenized, and filled into 1 ml ampuls which are sealed and autoclaved 20 minutes at 121°C. Each ampul contains 10 mg per ml of novel compound (a).

EXAMPLE 19

α-(p-Dimethylaminophenyl)-4-(α-hydroxy-α-phenylbenzyl)-1-piperidinebutanol

To 3 g (0.0065 mole) of 4'-dimethylamino-4-[4-(α-hydroxy-α-phenylbenzyl)piperidino]butyrophenone in about 250 ml of methanol was added portionwise at room temperature 2 g (0.032 mole) of potassium borohydride. The reaction mixture was stirred for 2 hours after which the solvent was evaporated and replaced with water, then extracted with ether. The ether fraction was dried over anhydrous magnesium sulfate, filtered and evaporated to an oil which was recrystallized several times from methanol-heptane and from isopropanol. The desired product was isolated as the isopropanol solvate, M.P. 58°–60°C.

EXAMPLE 20

4-(α-Hydroxy-α-phenylbenzyl)-α-(p-methoxyphenyl)-1-piperidinebutanol

By the procedure of Example 1, only substituting for 4'-tert-butyl-4-[4-(α-hydroxy-α-phenylbenzyl)-piperidino]-butyrophenone hydrochloride an appropriate amount of 4-[4-(α-hydroxy-α-phenylbenzyl)piperidino]-4'-methoxybutyrophenone hydrochloride, and using potassium borohydride instead of sodium borohydride the title compound was obtained, M.P. 130–133°C.

EXAMPLE 21

α-(p-Fluorophenyl)-4-(α-hydroxy-α-phenylbenzyl)-1-piperidineethanol

By the procedure of Example 1, only substituting for 4'-tert-butyl-4-[4-(α-hydroxy-α-phenylbenzyl)-piperidino]-butyrophenone an appropriate amount of 4'-fluoro-2-[4-(α-hydroxy-α-phenylbenzyl)-piperidino]acetophenone and using potassium borohydride instead of sodium borohydride the title compound was obtained, M.P. 168–170°C.

EXAMPLE 22

α-(p-tert-Butylphenyl)-4-(diphenylmethylene)-1-piperidinebutanol

To 9.76 g (0.02 mole) of 4'-tert-butyl-4-[4-(diphenylmethylene)piperidino]butyrophenone hydrochloride in 50 ml of methanol was added 1.1 g (0.02 mole) of sodium methoxide and then 2.7 g (0.05 mole) of potassium borohydride, and the mixture was stirred at room temperature for 2 hours. The methanol was removed at reduced pressure on a steam bath after which 50 ml of 10 percent sodium hydroxide solution was added. The mixture was stirred for 15 minutes, and 100 ml of chloroform was added. Stirring was continued for one/half hour. The chloroform layer was separated and combined with two 25 ml chloroform extracts of the aqueous phase. The combined chloroform extracts were washed with water then with a saturated sodium chloride solution, dried over magnesium sulfate, filtered and concentrated to a solid. The solid material was recrystallized from ethanol-water to give α-(p-tert-butylphenyl)-4-(diphenylmethylene)-1-piperidinebutanol, M.P. 122–124°C.

EXAMPLE 23

4-(α-Hydroxy-α-phenylbenzyl)-α-[p-(N-methylpiperazino)-phenyl]-1-piperidinebutanol When in the procedure of Example 19, 7 g (0.013 mole) of 4-[4-(α-hydroxy-α-phenylbenzyl)piperidino]-4'-(N-methylpiperazino)butyrophenone was substituted for 4'-dimethylamino-4-[4-(α-hydroxy-α-phenylbenzyl)piperidino]-butyrophenone, and 1.4 g (0.026 mole) of potassium borohydride was used, 4-α-hydroxy-α-phenylbenzyl)-α-[4-(N-methylpiperazino)-phenyl]-1-piperidinobutanol recrystallized from acetone-hexane was obtained, M.P. 158–160°C. (polymorph, M.P. 83–86°C.).

EXAMPLE 24

4-(α-Hydroxy-α-phenylbenzyl)-α-(p-morpholinophenyl)-1-piperidinebutanol

When in the procedure of Example 19, 2 g(0.004 mole) of 4-[4-(α-hydroxy-α-phenylbenzyl)piperidino]-4'-morpholinobutyrophenone was substituted for 4'-dimethylamino-4-[4-(α-hydroxy-α-phenylbenzyl)-piperidino]butyrophenone, and 0.43 g (0.008 mole) of potassium borohydride was used, 4-(α-hydroxy-α-phenylbenzyl)-α-(p-morpholinophenyl)-1-piperidinobutanol was obtained, M.P. 83–86°C.

EXAMPLE 25

4-(Diphenylmethylene)-α-(p-pyrrolidinophenyl)-1-piperidinebutanol

When in the procedure of Example 19, 5 g (0.01 mole) of 4-[4-(diphenylmethylene)piperidino-4'-pyrrolidinobutyrophenone was substituted for 4'-dimethylamino-4-[4-(α-hydroxy-α-phenylbenzyl)-piperidino]butyrophenone, and 1.6 g (0.03 mole) of potassium borohydride was used, 4-diphenylmethylene-α-(p-pyrrolidinophenyl)-1-piperidinebutanol was obtained, M.P. 125°–127°C.

EXAMPLE 26

(−)-α-(p-tert-Butylphenyl)-4-(α-hydroxy-α-phenylbenzyl)-1-piperidinebutanol

A mixture of 9.5 g (0.02 mole) of ± α-(4-tert-butylphenyl)-4-(α-hydroxy-α-phenylbenzyl)-1-piperidinebutanol, 7.0 g (0.02 mole) of (+) binaphthylphosphoric acid and 70 ml of methanol was heated at 55°C to form a solution. The solution was allowed to stand at 25°C for 20 hours to slowly crystallize. The solid was filtered and the residue (7.6 g) was recrystallized seven times from methanol by dissolving in 4–7 ml/g after which it was allowed to stand 20 hours at 25°C to give 1.4 g of the (+) binaphthylphosphoric acid salt of (−)-α-(4-tert-butylphenyl)-4-(α-hydroxy-α-phenylbenzyl)-1-piperidinebutanol. This salt was mixed with 11 ml of acetone and 1.0 ml of 10 percent sodium hydroxide solution, and the mixture was warmed to form a solution. The solution was concentrated to a volume of 3 ml, diluted with water until cloudy, cooled and filtered. The solid was recrystallized from acetone-water to give 0.62 g of (−)-α-(4-tert-butylphenyl)-4-(α-hydroxy-α-phenylbenzyl)-1-piperidinebutanol, M.P. 144°–145°C., [α]$_D^{25}$ = −46.12° (CHCl$_3$, C = 4.3303).

EXAMPLE 27

(+)-α-(p-tert-Butylphenyl)-4-(α-hydroxy-α-phenylbenzyl)-1-piperidinebutanol

A mixture of 5.6 g (0.0119 mole) of ± α-(4-tert-butylphenyl)-4-(α-hydroxy-α-phenylbenzyl)-1-piperidinebutanol, 4.1 g (0.0119 mole) of (−) binaphthylphosphoric acid and 50 ml of methanol was heated at 55°C to form a solution. The solution was concentrated to 25 ml and allowed to stand at 25°C for 4 hours to crystallize. The mixture was cooled to 5°C for 48 hours and filtered. The residue (5.5 g) was recrystallized seven times from methanol by dissolving in 3–6 ml/g after which it was allowed to stand 20 hours at 25°C to give 1.12 g of the (−) binaphthylphosphoric acid slat of (+)-α-(4-tert-butylpheny)-4-(α-hydroxy-α-phenylbenzyl)-1-piperidinebutanol. This salt was dissolved in 12 ml of acetone, treated with 2–3 ml of 10 percent sodium hydroxide solution, concentrated to 8 ml, cooled in an ice bath and filtered. The solid was recrystallized two times from acetone-water to give 0.46 g of (+)-α-(4-tert-butylphenyl)-4-(α-hydroxy-α-phenylbenzyl)-1-piperidinebutanol, M.P. 144°–145°C; [α]$_D^{25}$ = +44.61° (CHCl$_3$, C = 4.139).

We claim:
1. A compound selected from a base of the formula

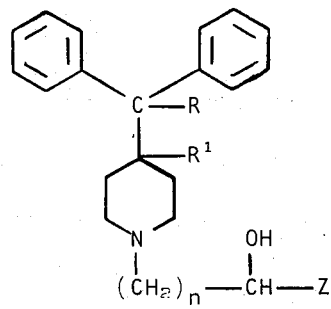

wherein R is selected from the group consisting of hydrogen or hydroxy; R$^1$ is hydrogen; or R and R$^1$ taken together form a second bond between the carbon atoms bearing R and R$^1$; $n$ is a positive whole integer of from 1 to 3; and Z is selected from the group consisting of thienyl, phenyl, or substituted phenyl wherein the substituents on the substituted pheny may be attached at the ortho, meta, or para positions of the substituted phenyl ring and are selected from the group consisting of a halogen atom, a straight or branched lower alkyl chain of from 1 to 4 carbon atoms, a lower alkoxy group of from 1 to 4 carbon atoms, a di(lower)alkylamino group, or a saturated monocyclic heterocyclic ring selected from the group consisting of pyrrolidino, piperidino, morpholino, or N-(lower)alkylpiperazino, or pharmaceutically acceptable acid addition salts thereof.

2. A compound of claim 1 where R is hydrogen.
3. A compound of claim 2 wherein $n$ is 3.

4. A compound of claim 3 which is 4-(diphenylmethyl)-α-phenyl-1-piperidinebutanol or a pharmaceutically acceptable acid addition salt thereof.

5. A compound of claim 3 which is 4-(diphenylmethyl)-α-(p-fluorophenyl)-1-piperidinebutanol or a pharmaceutically acceptable acid addition salt thereof.

6. A compound of claim 1 wherein R is hydroxy.

7. A compound of claim 6 wherein $n$ is 3.

8. A compound of claim 7 which is α-(p-fluorophenyl)-4-(α-hydroxy-α-phenylbenzyl)-1-piperidinebutanol or a pharmaceutically acceptable acid addition salt thereof.

9. A compound of claim 7 which is α-(p-tert-butylphenyl)-4-(α-hydroxy-α-phenylbenzyl)-1-piperidinebutanol or a pharmaceutically acceptable acid addition salt thereof.

10. A compound of claim 7 which is 4-(α-hydroxy-α-phenylbenzyl)-α-(2-thienyl)-1-piperidinebutanol or a pharmaceutically acceptable acid addition salt thereof.

11. A compound of claim 7 which is 4-(α-hydroxy-α-phenylbenzyl)-α-(p-piperidinophenyl)-1-piperidinebutanol or a pharmaceutically acceptable acid addition salt thereof.

12. A compound of claim 7 which is 4-(α-hydroxy-α-phenylbenzyl)-α-(p-dimethylaminophenyl)-1-piperidinebutanol or a pharmaceutically acceptable acid addition salt thereof.

13. A compound of claim 6 wherein $n$ is 1.

14. A compound of claim 13 which is α-(p-fluorophenyl)-4-(α-hydroxy-α-phenylbenzyl)-1-piperidineethanol or a pharmaceutically acceptable acid addition salt thereof.

15. A compound of claim 1 wherein R and $R^1$ taken together form a second bond between the carbon atoms bearing R and $R'$.

16. A compound of claim 15 wherein $n$ is 3.

17. A compound of claim 16 which is α-(p-bromophenyl)-4-(diphenylmethylene)-1-piperidinebutanol or a pharmaceutically acceptable acid addition salt thereof.

18. A compound of claim 16 which is α-(p-fluorophenyl)-4-(diphenylmethylene)-1-piperidinebutanol or a pharmaceutically acceptable acid addition salt thereof.

19. The compound (+)-α-(p-tert-butylphenyl)-4-(α-hydroxy-α-phenylbenzyl)-1-piperidinebutanol or a pharmaceutically acceptable acid addition salt thereof.

20. The compound (−)-α-(p-tert-butylphenyl)-4-(α-hydroxy-α-phenylbenzyl)-1-piperidinebutanol or a pharmaceutically acceptable acid addition salt thereof.

* * * * *

UNITED STATES PATENT AND TRADEMARK OFFICE
CERTIFICATE OF CORRECTION

PATENT NO. : 3,878,217
DATED : April 15, 1975
INVENTOR(S) : Albert A. Carr and C. Richard Kinsolving It is certified that error appears in the above-identified patent and that said Letters Patent are hereby corrected as shown below:

In the abstract, line 11 after the structure, "atoms, di(lower-alkylamino..." should read "atoms, di(lower)alkylamino". Column 3, line 66, "praticales" should read "particles". Column 6, line 34, "146.5°-148.5°C" should read "146.5-148.5°C". Column 7 line 59, "eith." should read "ether". Column 11, line 10, "M.P. 122-124°C" should read "122.5-124°C"; line 21, "4-α-hydroxy-α" should read "4-(α-hydroxy-α".

Signed and Sealed this seventeenth Day of February 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE

CERTIFICATE EXTENDING PATENT TERM
UNDER 35 U.S.C. 156

Patent No.   : 3,878,217

Dated        : Apr. 15, 1975

Inventor(s)  : Carr et al.

Patent Owner : Merrell Dow Pharmaceuticals Inc.

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

I have caused the seal of the Patent and Trademark Office to be affixed this Eighteenth day of April, 1986.

Donald J. Quigg

Assistant Secretary and Commissioner of Patents and Trademarks